(12) United States Patent
Thompson et al.

(10) Patent No.: US 9,709,141 B2
(45) Date of Patent: Jul. 18, 2017

(54) RATCHET WRENCH AND PAWL MECHANISM

(71) Applicant: Snap-on Incorporated, Kenosha, WI (US)

(72) Inventors: Christopher Thompson, Franklin, WI (US); Daniel Eggert, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 5 days.

(21) Appl. No.: 14/839,011

(22) Filed: Aug. 28, 2015

(65) Prior Publication Data

US 2017/0059021 A1   Mar. 2, 2017

(51) Int. Cl.
*F16H 31/00*   (2006.01)
*B25B 13/46*   (2006.01)

(52) U.S. Cl.
CPC ........... *F16H 31/002* (2013.01); *B25B 13/46* (2013.01)

(58) Field of Classification Search
CPC ... B25B 13/463; B25B 13/46; Y10T 74/2123; F16H 31/002
See application file for complete search history.

(56) References Cited

U.S. PATENT DOCUMENTS

| 3,436,992 | A | 4/1969 | Over et al. |
|---|---|---|---|
| 6,691,594 | B2 | 2/2004 | Chen |
| 6,971,285 | B2 | 12/2005 | Chen |
| 6,981,434 | B2 | 1/2006 | Chen |
| 7,089,830 | B2 | 8/2006 | Hu |
| 7,124,664 | B1 | 10/2006 | Lee |
| 7,802,498 | B2 | 9/2010 | Hu |
| 7,827,886 | B2 | 11/2010 | Hu |
| 7,975,574 | B2 | 7/2011 | Hu |
| 8,047,101 | B2 | 11/2011 | Cross et al. |
| 8,683,894 | B1 | 4/2014 | Chen et al. |
| 8,720,308 | B2 | 5/2014 | Hopper et al. |
| 9,038,507 | B2 | 5/2015 | Thompson et al. |
| 2007/0101832 | A1* | 5/2007 | Lee ..................... B25B 13/463 81/63.1 |
| 2007/0256525 | A1 | 11/2007 | Lee |
| 2007/0289414 | A1 | 12/2007 | Lee |
| 2009/0314139 | A1 | 12/2009 | Hu |

(Continued)

FOREIGN PATENT DOCUMENTS

TW   M287205 U   2/2006
TW   201236818 A   3/2011

OTHER PUBLICATIONS

Australian Government Patent Examination Report No. 1, dated Sep. 16, 2016; 5 pages.

(Continued)

*Primary Examiner* — Thomas C Diaz
(74) *Attorney, Agent, or Firm* — Seyfarth Shaw LLP

(57) ABSTRACT

A pawl mechanism that reduces the possibility of pawl spring over-compression and damage. The invention can include bumpers disposed near the internal surfaces of the pawls and can space the internal surfaces when the pawls contact one another to reduce the amount of compression applied to the pawl spring. The pawl spring can be inserted into respective cavities on the pawls to further prevent additional compression of and damage to the pawl spring.

11 Claims, 5 Drawing Sheets

(56) References Cited

U.S. PATENT DOCUMENTS

2013/0145906 A1 6/2013 Hu
2014/0311300 A1 10/2014 Chen
2016/0236328 A1* 8/2016 Chen ...................... B25B 13/04

OTHER PUBLICATIONS

UK Combined Search and Examination Report, dated Jan. 13, 2017; 7 pages.

* cited by examiner

RATCHET WRENCH AND PAWL MECHANISM

TECHNICAL FIELD OF THE INVENTION

The present invention relates generally to a pawl mechanism. More particularly, the present invention relates to a pawl mechanism that reduces the chances of damage to a pawl spring caused by over-compression.

BACKGROUND OF THE INVENTION

Pawl mechanisms are common components of ratchet wrenches. A pawl mechanism can include a pawl that grips a drive gear to selectively allow rotation of the drive gear in a first rotational direction, but substantially prevent relative rotation of the drive gear in a second rotational direction opposite the first rotational direction to apply torque to a work piece. Likewise, the pawl can be selectively disposed to allow rotation in the second rotational direction, while substantially preventing relative rotation of the drive gear in the first rotational direction to apply torque to the work piece in an opposite manner. The pawl mechanism can include a pair of pawls. such that the user of the ratchet wrench can select one of the two rotational directions with a reversing lever, and either insert or remove a work piece by rotating the ratchet wrench in a selected direction. For example, with reference to FIGS. 4 and 5, the pawl mechanism 400 can include a first pawl 402 and a second pawl 404 separated by a pawl spring 406. The first 402 and second 404 pawls can respectively include first 406 and second 408 posts that can be gripped by a reversing lever (not shown). The first 402 and second 404 pawls can also respectively include first 412 and second 414 internal surfaces.

Many times, when a work piece is removed, the work piece reaches a point when it requires less torque compared to earlier in the removal process, and "breaks loose" from the work surface. For example, when a bolt is initially loosened from a nut or receiving threads, a certain amount of torque must be applied to initially loosen the bolt. Once the both is initially loosened, the amount of torque required to continue removing the bolt is typically less. Under such circumstances, there is a rapid decrease in the amount of torque applied to the work piece, and the first pawl 402 can disengage with the drive gear and strike the second pawl 404 (or vice versa). When this occurs, the first internal surface 412 can push toward the second internal surface 414 and substantially compress the pawl spring 406 to the point of damaging the spring. At times, movement of the first pawl 402 towards the second pawl 404 can make the pawl spring 406 "go solid," or over-compress to the point where the coils of the pawl spring 406 touch, and where additional compressive forces do not further compress the pawl spring 406. Over-compression can damage the pawl spring 406, reducing the durability of the ratchet wrench, and limiting the performance of the ratchet wrench during its lifetime.

SUMMARY OF THE INVENTION

The present invention broadly comprises a pawl mechanism that prevents or reduces the possibility of a pawl spring being over-compressed. The pawl mechanism can include bumpers disposed proximate the internal surfaces of the first and second pawls, such that the bumpers space the internal surfaces when the pawls contact one another, therefore reducing the amount of compression applied to the pawl spring. The pawl spring can further be inserted into a cavity in the pawls, preventing additional compression of the pawl spring and reducing the possibility of the pawl spring being over-compressed.

For example, the present invention includes a pawl mechanism including a first pawl having first teeth and further including a first side proximate the first teeth, a second side opposite the first side, and a third side coupling the first and second sides. The mechanism can further include a second pawl having second teeth and further including a first side proximate the first teeth, a second side opposite the first side, and a third side coupling the first and second sides. A pawl spring can separate the first and second pawls. The first pawl includes a first bumper proximate the second side of the first pawl and extending from the third side of the first pawl to create a first indent within the first pawl.

Further disclosed is a tool including a drive gear adapted to apply torque to a work piece, a reversing lever adapted to select a rotational drive direction of the drive gear, and a pawl mechanism adapted to engage the drive gear to effect the drive direction selected by the reversing lever. The pawl mechanism can include a first pawl having first teeth and further including a first side proximate the first teeth, a second side opposite the first side, and a third side coupling the first and second sides. The mechanism can further include a second pawl having second teeth and further including a first side proximate the first teeth, a second side opposite the first side, and a third side coupling the first and second sides. A pawl spring can separate the first and second pawls. The first pawl includes a first bumper disposed proximate the second side of the first pawl and extending from the third side of the first pawl to create a first indent within the first pawl.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
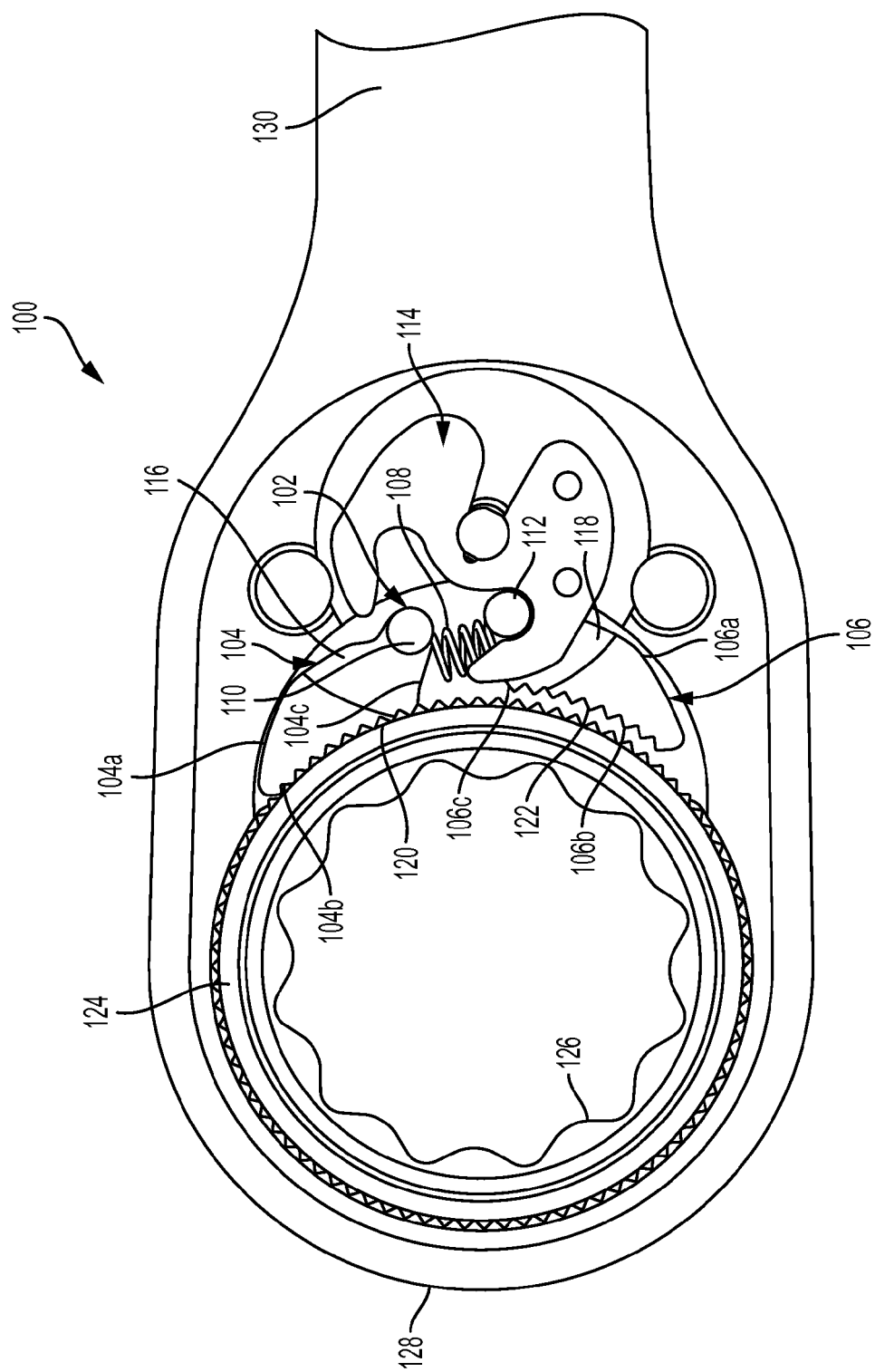
FIG. 1 is a top view of a ratchet wrench according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a pawl mechanism that prevents or reduces the chances of a pawl spring being over-compressed. For example, the pawl mechanism can include first and second pawls opposite one another. Bumpers can be located near the internal surfaces of the first and second pawls and space the internal surfaces when the pawls contact one another. This spacing limits the amount of compression applied to the pawl spring and reduces the chances of the pawl spring being over-compressed. The pawl mechanism can further include cavities that the spring is inserted into, further preventing additional compression of the pawl spring and reducing the possibility of the pawl spring being over-compressed.

Referring to FIG. 1, the present invention can be incorporated into a tool 100, such as a ratchet wrench. The tool 100 can include a pawl mechanism 102 having a first pawl 104 and a second pawl 106 separated by a pawl spring 108. The first pawl 104 can include a first side 104*a* facing away from the pawl teeth, and a second side 104*b* opposite the first side 104*a* proximate the pawl teeth. Similarly, the second pawl 106 can include a first side 106*a* facing away from the pawl teeth, and a second side 106*b* opposite the first side 106*a* proximate the pawl teeth. The first 104 and second 106 pawls can also respectively include side surfaces 104*c*, 106*c* that face one another and that are separated by the pawl spring 108.

The first 104 and second 106 pawls can respectively include first 110 and second 112 posts that are engagable with a reversing lever 114. For example, the first 104 and second 106 pawls can respectively include first 116 and second 118 valleys that allow clearance for the reversing lever 114 to engage the first 110 and second 112 posts and select a drive direction of the tool 100. The first 104 and second 106 pawls can also respectively include first 120 and second 122 teeth that engage a drive gear 124 of the tool 100. For example, the reversing lever 114 selectively engages the first 110 and second 112 posts to rotate either of the first 104 and second 106 pawls into engagement with the drive gear 124. The user can then rotate the tool 100 and cause the drive gear 124 to impart torque on a work piece in a desired rotational direction. For example, the drive gear 124 can be coupled to a receiving portion 126 with structure to, for example, engage a socket or other accessory, as is known in the art. The above components can be located in a head 128 and can be coupled to a handle 130 of the tool 100.

The pawl spring 108 can be any elastic member, without departing from the spirit and scope of the present invention. In an embodiment, the pawl spring 108 is a coil spring, but the pawl spring 108 can be a leaf spring, torsion or double torsion spring, tension spring, compression spring, tapered spring, or simply an object elastically biased in one manner or another. Further, the pawl spring 108 need not be a spring at all, or even an elastically biased object, and can be any object that causes the first 104 and second 106 pawls to bias away from one another. Any other implementation of the pawl spring 108, including no pawl spring 108 at all, can be implemented without departing from the spirit and scope of the present invention.

Figure 2:
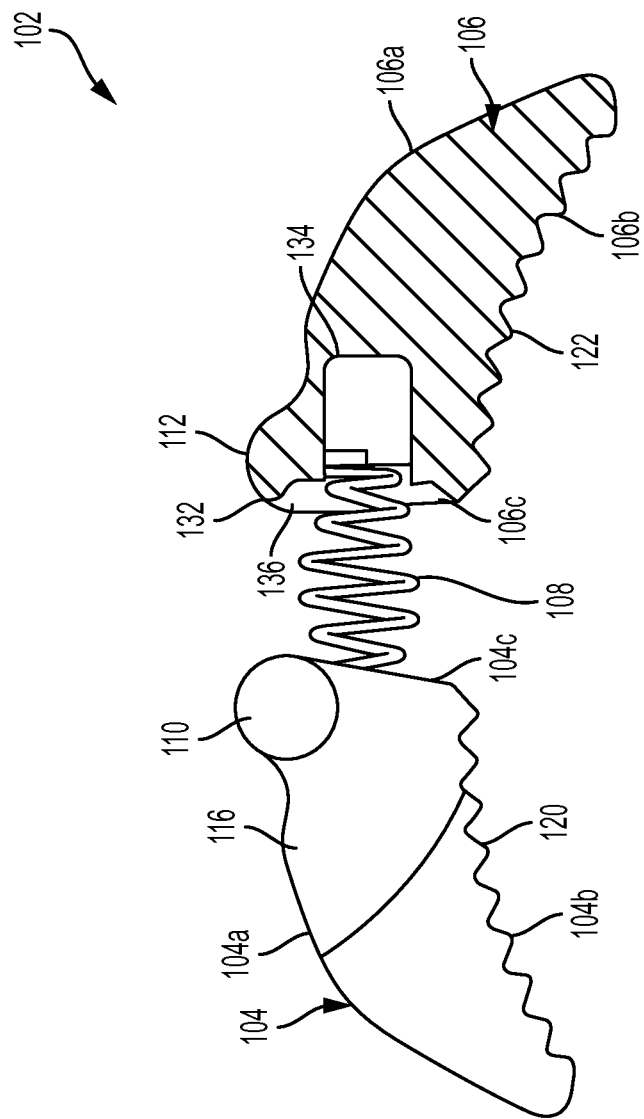
FIG. 2 is a top view of a pawl mechanism according to an embodiment of the present invention.
Figure 3:
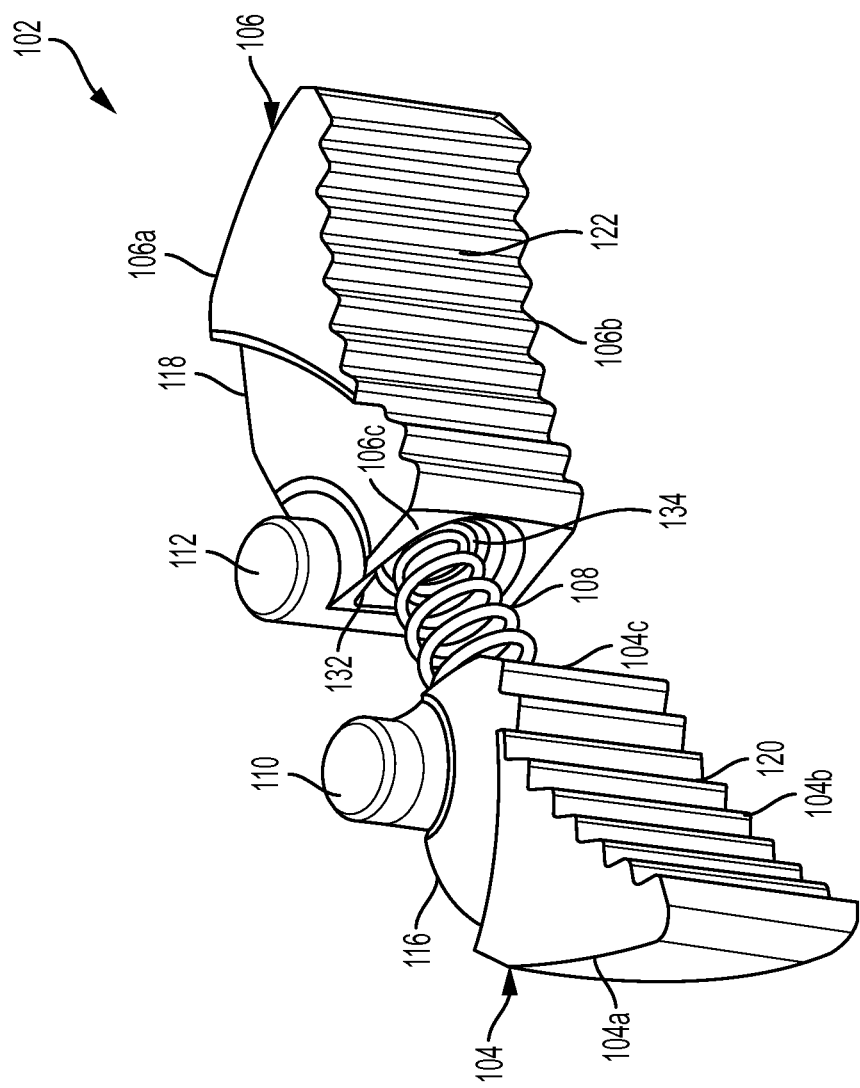
FIG. 3 is a front perspective view of the pawl mechanism illustrated in FIG. 2.

Referring to FIGS. 2 and 3, the pawl mechanism 102 can include a bumper 132 and a cavity 134 disposed within either or both of the first 104 or second 106 pawls. Although FIGS. 2 and 3 illustrate the bumper 132 and cavity 134 in only the second pawl 106, it should be understood that both pawls 104, 106 can include respective bumpers 132 and cavities 134 to prevent or reduce the chances of the pawl spring 108 from being over-compressed.

Figure 4:
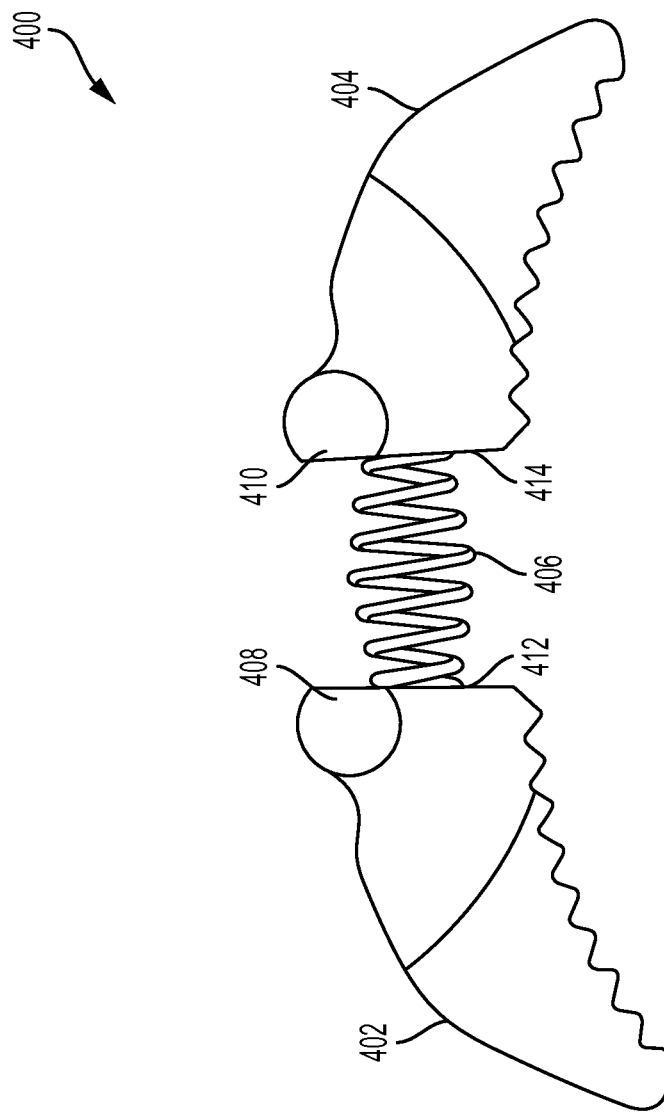
FIG. 4 is a top view of a prior art pawl mechanism according to an embodiment of the present invention.
Figure 5:
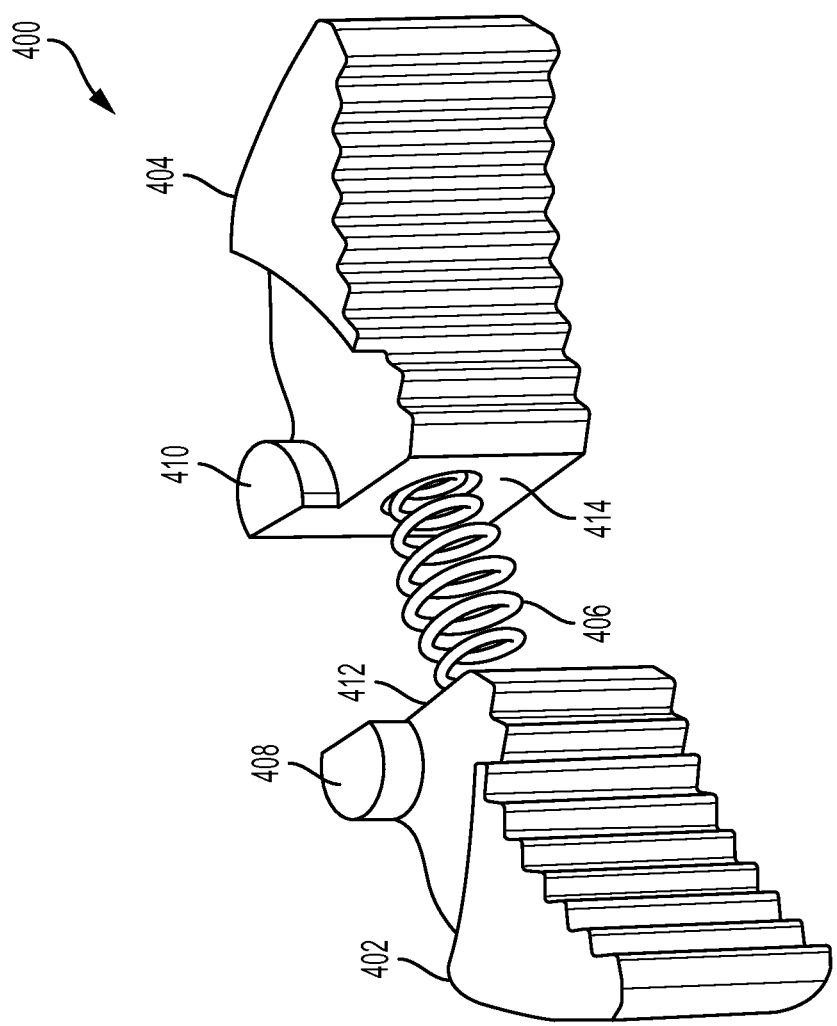
FIG. 5 is a front perspective view of the prior art pawl mechanism illustrated in FIG. 4.

As shown, the bumper 132 can extend internally to the second pawl 106 relative to the side surface 106*c* of the second pawl 106. This creates an indent 136 in the second pawl 106, and a similar indent can exist in the first pawl 104. When the tool 100 is in use, the bumper 132 can contact a corresponding bumper in the first pawl 104, and the indents in the first and second pawls can create a space for the pawl spring 108 to move toward rather than cause the pawl spring 108 to be over-compressed. Comparing the conventional pawl mechanism 400 in FIGS. 4 and 5 with the present invention of FIGS. 1-3, the conventional pawl mechanism 400 includes no such indent 136 and, accordingly, applies a more direct compressive force to the pawl spring 406 when the first 402 and second 404 pawls move toward one another. The inventive pawl mechanism 102, however, allows movement of the pawl spring 108 into the indents 136 to avoid this direct compressive force and reduces the chances of the pawl spring 108 being over-compressed.

Although primarily shown only on the first side 104*a*, 106*a* of the pawls 104, 106, the bumper 132 can be located around the entire circumference of the indent 134 to further prevent the pawl spring 108 from being over-compressed. Typically, the pawls 104, 106 will each rotate toward one another, such that the first side 104*a*, 106*a* of the pawls 104, 106 contact one other rather than the second side 104*b*, 106*b*. However, the pawl mechanism 102 can include a bumper 132 at any location, such as at the second side 104*b*, 106*b*, without departing from the spirit and scope of the present invention.

The pawl mechanism 102 can also include cavities 134 that are disposed within the pawls 104, 106. The cavities 134 can receive the pawl spring 108 and further prevent or reduce the possibility of the pawl spring 108 being over-compressed. For example, the cavities 134 can allow for a longer pawl spring 108 with a larger elastic force so that compression of the pawl spring 108 ends when the two side surfaces 104*c*, 106*c* contact one another, long before the pawl spring 108 is over-compressed. In an embodiment, the cavities 134 extend from the side surface 104*c*, 106*c* to a point internal the pawls 104, 106 past the posts 110, 112.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A pawl mechanism, comprising:
   first and second pawls each having opposing first and second sides and a third side coupling the first and second sides, each of the first sides has first teeth and each of the third sides has a cavity extending therefrom;

a pawl spring disposed between the first and second pawls; and a first bumper disposed on the first pawl proximate the third side of the first pawl and extending inwardly from the third side of the first pawl to create a first indent within the first pawl proximate the cavity of the first pawl, wherein the first indent has a first cross sectional width larger than a second cross sectional width of the cavity of the first pawl and wherein the pawl spring at the third side is spaced from the first bumper.

2. The pawl mechanism of claim 1, further comprising a second bumper disposed on the second pawl proximate the third side of the second pawl and extending inwardly from the third side of the second pawl to create a second indent within the second pawl.

3. The pawl mechanism of claim 1, wherein the pawl spring engages the cavity of each of the first and second pawls.

4. The pawl mechanism of claim 1, wherein the first pawl further includes a first post, and the cavity extends from the third side of the first pawl past the first post.

5. The pawl mechanism of claim 1, wherein the first bumper extends around a periphery of the third side of the first pawl.

6. A pawl mechanism for a tool including a drive gear adapted to apply torque to a work piece and a reversing lever adapted to engage the pawl mechanism to select a rotational drive direction of the drive gear, the pawl mechanism comprising:

first and second pawls each having opposing first and second sides and a third side coupling the first and second sides, each of the first sides having first teeth and each of the third sides having a cavity extending therefrom;

a pawl spring separating the first and second pawls; and a first bumper disposed on the first pawl proximate the third side of the first pawl and extending inwardly from the third side of the first pawl to create a first indent within the first pawl proximate the cavity of the first pawl, wherein the first indent has a first cross sectional width larger than a second cross sectional width of the cavity of the first pawl and wherein the pawl spring at the third side is spaced from the first bumper.

7. The pawl mechanism of claim 6, wherein the second pawl includes a second bumper disposed proximate the third side of the second pawl and extending inwardly from the third side of the second pawl to create a second indent within the second pawl.

8. The pawl mechanism of claim 6, wherein the pawl spring engages the cavity of each of the first and second pawls.

9. The pawl mechanism of claim 6, wherein the first pawl further includes a first post, and the cavity extends from the third side of the first pawl past the first post.

10. The pawl mechanism of claim 6, wherein the first bumper extends around a periphery of the third side of the first pawl.

11. The pawl mechanism of claim 9, wherein the reversing lever engages the first post to select the drive direction.

* * * * *